(12) United States Patent
Volk

(10) Patent No.: US 11,027,897 B2
(45) Date of Patent: Jun. 8, 2021

(54) CHILD-RESISTANT SAFETY CONTAINER SYSTEMS AND METHODS

(71) Applicant: Charles Volk, Denver, CO (US)

(72) Inventor: Charles Volk, Denver, CO (US)

( * ) Notice: Subject to any disclaimer, the term of this patent is extended or adjusted under 35 U.S.C. 154(b) by 18 days.

(21) Appl. No.: 16/554,973

(22) Filed: Aug. 29, 2019

(65) Prior Publication Data
US 2020/0079557 A1    Mar. 12, 2020

Related U.S. Application Data

(60) Provisional application No. 62/728,185, filed on Sep. 7, 2018.

(51) Int. Cl.
| | | |
|---|---|---|
| *A01K 97/04* | (2006.01) | |
| *B65D 55/02* | (2006.01) | |
| *B65D 55/10* | (2006.01) | |
| *B65D 5/46* | (2006.01) | |
| *B65D 5/472* | (2006.01) | |
| *B65D 55/06* | (2006.01) | |
| *B65D 50/06* | (2006.01) | |
| *B65D 3/04* | (2006.01) | |
| *B65D 25/32* | (2006.01) | |

(52) U.S. Cl.
CPC ............ *B65D 50/067* (2013.01); *A01K 97/04* (2013.01); *B65D 3/04* (2013.01); *B65D 25/32* (2013.01); *B65D 55/06* (2013.01); *B65D 55/10* (2013.01); *B65D 2215/04* (2013.01)

(58) Field of Classification Search
CPC ...... A01K 97/04; B65D 5/46; B65D 5/46048; B65D 5/46056; B65D 5/68; B65D 2215/04; B65D 25/32; B65D 50/067; B65D 55/02

USPC ............... 206/531; 229/93, 125.22, 323, 5.7, 229/125.21, 117.25, 102, 117.24, 117.09, 229/117.19, 117.26; 220/760, 773, 751, 220/752, 758, 759, 770, 322; 215/273, 215/397; D9/443, 532
See application file for complete search history.

(56) References Cited

U.S. PATENT DOCUMENTS

| | | | |
|---|---|---|---|
| 459,253 A * | 9/1891 | Metz ..................... | B65D 51/242 |
| | | | 220/212.5 |
| 909,330 A * | 1/1909 | Pierson .................... | B65D 3/04 |
| | | | 229/93 |
| 1,008,237 A * | 11/1911 | Bretherton ............ | B65B 61/025 |
| | | | 53/411 |
| 1,016,755 A * | 2/1912 | Loweree ................ | B65D 35/42 |
| | | | 220/322 |
| 1,086,724 A * | 2/1914 | Matter ................. | B65D 50/067 |
| | | | 215/213 |
| 1,173,752 A * | 2/1916 | Smith ...................... | 229/125.17 |

(Continued)

*Primary Examiner* — Gideon R Weinerth
(74) *Attorney, Agent, or Firm* — Acuity IP, LLC; Nathan S. Cassel

(57) ABSTRACT

Systems and methods for providing improved child-resistant safety container systems. Exemplary container systems include a container body having a registration mark and two apertures, a cap body having a registration mark and two apertures, and a locking pin. The container body and cap body can be configured so that when they are engaged, there is alignment between the registration marks of the container and cap bodies, and there is vertical alignment and radial alignment between respective apertures of the container and cap bodies so as to allow insertion of the locking pin through the apertures.

14 Claims, 13 Drawing Sheets

(56) References Cited

U.S. PATENT DOCUMENTS

| | | | | |
|---|---|---|---|---|
| 1,325,852 A * | 12/1919 | Kirkpatrick | | A01J 9/00 220/17.2 |
| 1,477,043 A * | 12/1923 | Drake | | B65D 55/10 220/323 |
| 1,580,936 A * | 4/1926 | Wansner | | B44D 3/128 220/702 |
| 1,810,840 A * | 6/1931 | Miller | | B65D 5/46048 229/117.21 |
| 1,974,539 A * | 9/1934 | Le Comte | | B65D 55/06 220/284 |
| 2,561,488 A * | 7/1951 | Barker | | A45C 3/00 229/117.24 |
| 2,577,001 A * | 12/1951 | Cole | | B44D 3/14 220/760 |
| 2,601,190 A * | 6/1952 | Chandler | | B44D 3/128 220/696 |
| 2,709,317 A * | 5/1955 | Pease, Sr. | | A01K 97/02 43/44.99 |
| 2,711,337 A * | 6/1955 | Keenan | | A47J 47/18 294/33 |
| 2,974,825 A * | 3/1961 | Bruce | | B65D 3/10 220/789 |
| 2,979,853 A * | 4/1961 | Erving | | A01K 97/02 43/44.99 |
| 3,119,541 A * | 1/1964 | Lynn | | B65D 51/242 229/5.5 |
| 3,882,628 A * | 5/1975 | Stouder | | A01K 97/04 43/55 |
| 4,232,471 A * | 11/1980 | Kolk | | A01K 97/02 43/44.99 |
| 4,478,348 A * | 10/1984 | Cook | | B65D 55/02 220/318 |
| D284,360 S * | 6/1986 | Pollitz | | B44D 3/128 D11/143 |
| 5,638,977 A * | 6/1997 | Bianchi | | B65D 55/06 215/273 |
| 7,377,071 B1 * | 5/2008 | Thompson | | A01K 97/05 43/56 |
| 2017/0215638 A1* | 8/2017 | Markussen | | B65D 25/32 |
| 2017/0238519 A1* | 8/2017 | Heikkinen | | A01K 97/02 |
| 2020/0079557 A1* | 3/2020 | Volk | | B65D 50/067 |

\* cited by examiner

CHILD-RESISTANT SAFETY CONTAINER SYSTEMS AND METHODS

CROSS-REFERENCES TO RELATED APPLICATIONS

This application claims the benefit of U.S. Provisional Patent Application No. 62/728,185 filed Sep. 7, 2018, the content of which is incorporated herein by reference.

BACKGROUND OF THE INVENTION

Child-resistant packaging is used to store medications, household chemicals, and other materials that may be hazardous to children. Commonly known child-resistant packing designs include "Push Down And Turn" and "Squeeze Lock Closure" designs. Although these devices can be helpful in preventing children from obtaining access to hazardous materials, still further improvements are desired. Embodiments of the present invention provide solutions to at least some of these outstanding needs.

BRIEF SUMMARY OF THE INVENTION

Embodiments herein described include devices and methods for storing medications and other types of materials or substances. Exemplary packing embodiments include child-resistant containers that are compostable and/or recyclable. In some case, packaging devices may comply with 16 CFR 1700.20—Testing Procedure for Special Packaging, or other related ISO and/or ASTM standards. In some cases, container system components may be manufactured from compostable paper product. A recyclable and/or compostable paper locking mechanism can be integrated into the container to meet 36 CFR 1700.20 requirements. The locking mechanism is of a different design than the currently known "Push Down And Turn" and "Squeeze Lock Closure" designs. In some cases, a child-resistant safety container system includes an integrated locking clip. A deformable locking clip design can operate to prevent the container system from being opened in accordance with child safety regulations. Relatedly, embodiments of the present invention encompass container systems that comply with any of a variety of applicable safety standards, including child safety or packaging regulations or requirements promulgated at the state level.

In one aspect, embodiments of the present invention encompass child-resistant safety container systems for holding substance. An exemplary system includes a tubular container body, a tubular cap body, and a bendable locking pin. In some cases, a tubular container body has an open top portion, a closed bottom portion, and a registration mark. In some cases, the open top portion includes a cylindrical wall having an inner diameter and an outer diameter, the cylindrical wall of the open top portion defines a central longitudinal axis, the cylindrical wall of the open top portion includes a first aperture disposed at a first radial location on the cylindrical wall and a second aperture disposed at a second radial location on the cylindrical wall, and the first radial location and the second radial location define an axis that intersects the central longitudinal axis defined by the cylindrical wall of the open top portion. In some cases, a tubular cap body has a closed top portion, an open bottom portion, and a registration mark. In some cases, the open bottom portion includes a cylindrical wall having an inner diameter and an outer diameter, the cylindrical wall of the open bottom portion defines a central longitudinal axis, the cylindrical wall of the open bottom portion includes a first aperture disposed at a first radial location on the cylindrical wall and a second aperture disposed at a second radial location on the cylindrical wall, and the first radial location and the second radial location define an axis that intersects the central longitudinal axis defined by the cylindrical wall of the open bottom portion. In some cases, a bendable locking pin has a first linear length, a second linear length, and a semicircular length. In some cases, the semicircular length has a first end and a second end, the first linear length has an inner end and an outer end, the outer end is coupled with the first end of the semicircular length, the second linear length has an inner end and an outer end, the outer end is coupled with the second end of the semicircular length, and the first linear length and the second linear length are aligned along a common axis. In some cases, the inner diameter of the open bottom portion of the cylindrical wall of the tubular cap body is greater than the outer diameter of the cylindrical wall of the tubular container body. In some cases, the first linear length of the bendable locking pin extends through (i) the first aperture of the cylindrical wall of the open top portion of the tubular container body and (ii) the first aperture of the cylindrical wall of the open bottom portion of the tubular cap body. In some cases, the second linear length of the bendable locking pin extends through (i) the second aperture of the cylindrical wall of the open top portion of the tubular container body and (ii) the second aperture of the cylindrical wall of the open bottom portion of the tubular cap body. In some cases, the registration mark of the tubular container body and the registration mark of the tubular cap body are aligned when (i) the first aperture of the cylindrical wall of the open top portion of the tubular container body is adjacent the first aperture of the cylindrical wall of the open bottom portion of the tubular cap body, and (ii) the second aperture of the cylindrical wall of the open top portion of the tubular container body is adjacent the second aperture of the cylindrical wall of the open bottom portion of the tubular cap body.

In some instances, the first aperture of the tubular container body and the second aperture of the tubular container body are radially separated by an angle of 180 degrees, and the first aperture of the tubular cap body and the second aperture of the tubular cap body are radially separated by an angle of 180 degrees. In some instances, the first aperture of the tubular container body and the second aperture of the tubular container body are radially separated by an angle that is less than 180 degrees, and wherein the first aperture of the tubular cap body and the second aperture of the tubular cap body are radially separated by an angle that is less than 180 degrees. In some instances, the tubular container body includes a compostable material such as a kraft paperboard or a compostable plastic. In some instances, the tubular cap body includes a compostable material such as a kraft paperboard or a compostable plastic. In some instances, the locking pin includes a recyclable material such as a metal or a plastic. In some instances, the first and second apertures of the tubular cap body are separated from a bottom surface of the closed top portion of the tubular cap body by a distance D2, the first and second apertures of the tubular container body are separated from a top rim of the open top portion of the tubular container body by a distance D1, and distance D1 is equal to distance D2.

In another aspect, embodiments of the present invention encompass child-resistant safety container systems that include a container body, a cap body, and a locking pin. In some cases, a container body has an open top portion, a closed bottom portion, and a registration mark. In some cases, the open top portion includes a wall, the wall of the open top portion defines a central longitudinal axis, the wall of the open top portion includes a first aperture disposed at a first radial location on the wall and a second aperture disposed at a second radial location on the wall, and the first radial location and the second radial location define an axis that intersects the central longitudinal axis defined by the wall of the open top portion. In some cases, a cap body has a closed top portion, an open bottom portion, and a registration mark. In some cases, the open bottom portion includes a wall, the wall of the open bottom portion defines a central longitudinal axis, the wall of the open bottom portion includes a first aperture disposed at a first radial location on the wall and a second aperture disposed at a second radial location on the wall, and the first radial location and the second radial location define an axis that intersects the central longitudinal axis defined by the wall of the open bottom portion. In some cases, a bendable locking pin has a first linear length, a second linear length, and an intermediate length. In some cases, the intermediate length has a first end and a second end, the first linear length has an inner end and an outer end, the outer end is coupled with the first end of the intermediate length, the second linear length has an inner end and an outer end, the outer end is coupled with the second end of the intermediate length, and the first linear length and the second linear length are aligned along a common axis. In some cases, the first linear length of the bendable locking pin extends through (i) the first aperture of the wall of the open top portion of the container body and (ii) the first aperture of the wall of the open bottom portion of the cap body. In some cases, the second linear length of the bendable locking pin extends through (i) the second aperture of the wall of the open top portion of the container body and (ii) the second aperture of the wall of the open bottom portion of the cap body. In some cases, the registration mark of the container body and the registration mark of the cap body are aligned when (i) the first aperture of the wall of the open top portion of the container body is adjacent the first aperture of the wall of the open bottom portion of the cap body, and (ii) the second aperture of the wall of the open top portion of the container body is adjacent the second aperture of the wall of the open bottom portion of the cap body.

In some instances, the first aperture of the tubular container body and the second aperture of the tubular container body are radially separated by an angle of 180 degrees, and wherein the first aperture of the tubular cap body and the second aperture of the tubular cap body are radially separated by an angle of 180 degrees. In some instances, the first aperture of the tubular container body and the second aperture of the tubular container body are radially separated by an angle that is less than 180 degrees, and wherein the first aperture of the tubular cap body and the second aperture of the tubular cap body are radially separated by an angle that is less than 180 degrees. In some instances, the container body includes a compostable material such as a kraft paperboard or a compostable plastic. In some instances, the cap body includes a compostable material such as a kraft paperboard or a compostable plastic. In some instances, a locking pin includes a recyclable material such as a metal or a plastic. In some instances, the first and second apertures of the tubular cap body are separated from a bottom surface of the closed top portion of the tubular cap body by a distance D2, the first and second apertures of the tubular container body are separated from a top rim of the open top portion of the tubular container body by a distance D1, and distance D1 is equal to distance D2.

DETAILED DESCRIPTION OF THE INVENTION

Embodiments of the present invention encompass systems and methods for storing medications and other types of materials. Exemplary packing embodiments include child-resistant container systems include one or more components, such as a container body, a cap body, or a locking pin, which are compostable and/or recyclable. In some case, packaging devices may comply with 16 CFR 1700.20—Testing Procedure for Special Packaging, or other related ISO and/or ASTM standards.

Figure 1A:
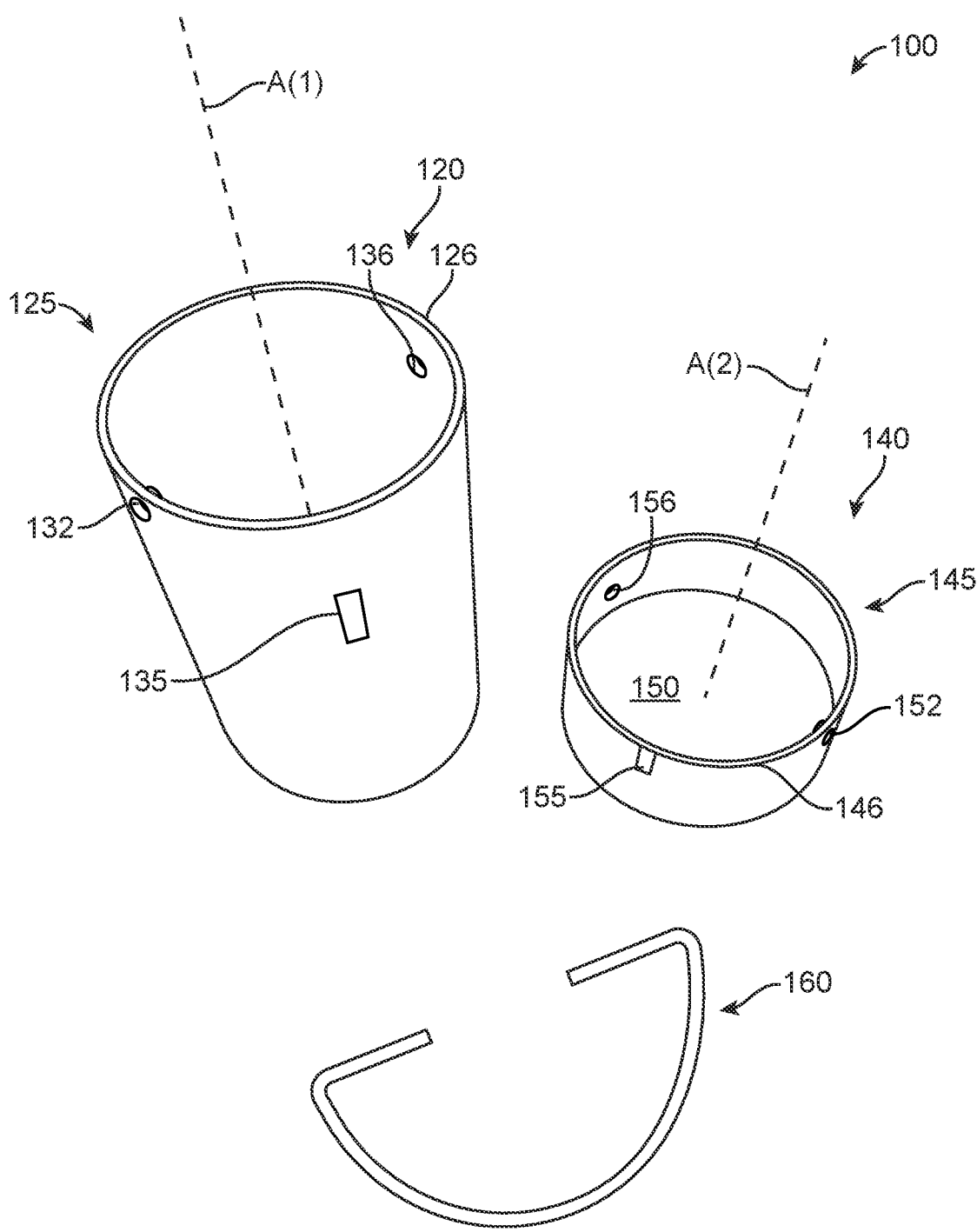
FIGS. 1A to 1D depict aspects of a child-resistant safety container system according to embodiments of the present invention.

Turning now the drawings, FIG. 1A illustrates a child-resistant safety container system 100 according to embodiments of the present invention. The container system can be used to for holding any of a variety of desired substances, including various items or materials, for example therapeutic medicaments, tobacco, plant seeds, cannabis products, trail mix, peanuts, raisins, gems, diamonds, disposable plastic bags, bait such as catfish bait, pieces of chicken liver, and the like. The container system 100 includes a container body 120 (shown in an upright position), a cap body 140 (shown in an upside-down position), and a locking pin 160. As shown here, the container body 120 can be a tubular container body. Container body 120 includes an open top portion 125, a closed bottom portion (not visible), and a registration mark 135. Cap body 140 includes an open bottom portion 145, a closed top portion 150, and a registration mark 155. As shown here, container body 120 and cap body 140 provide a generally circular cylindrical shape. It is appreciated that in some embodiments, a container body and cap body may provide any of a variety of shapes, including box shapes, ovoid shapes, cuboid shapes, rectangular prism shapes, triangular prism shapes, other prism shapes, spheroid shapes, and other cylindrical shapes such as elliptic cylinder shapes.

Figure 1B:
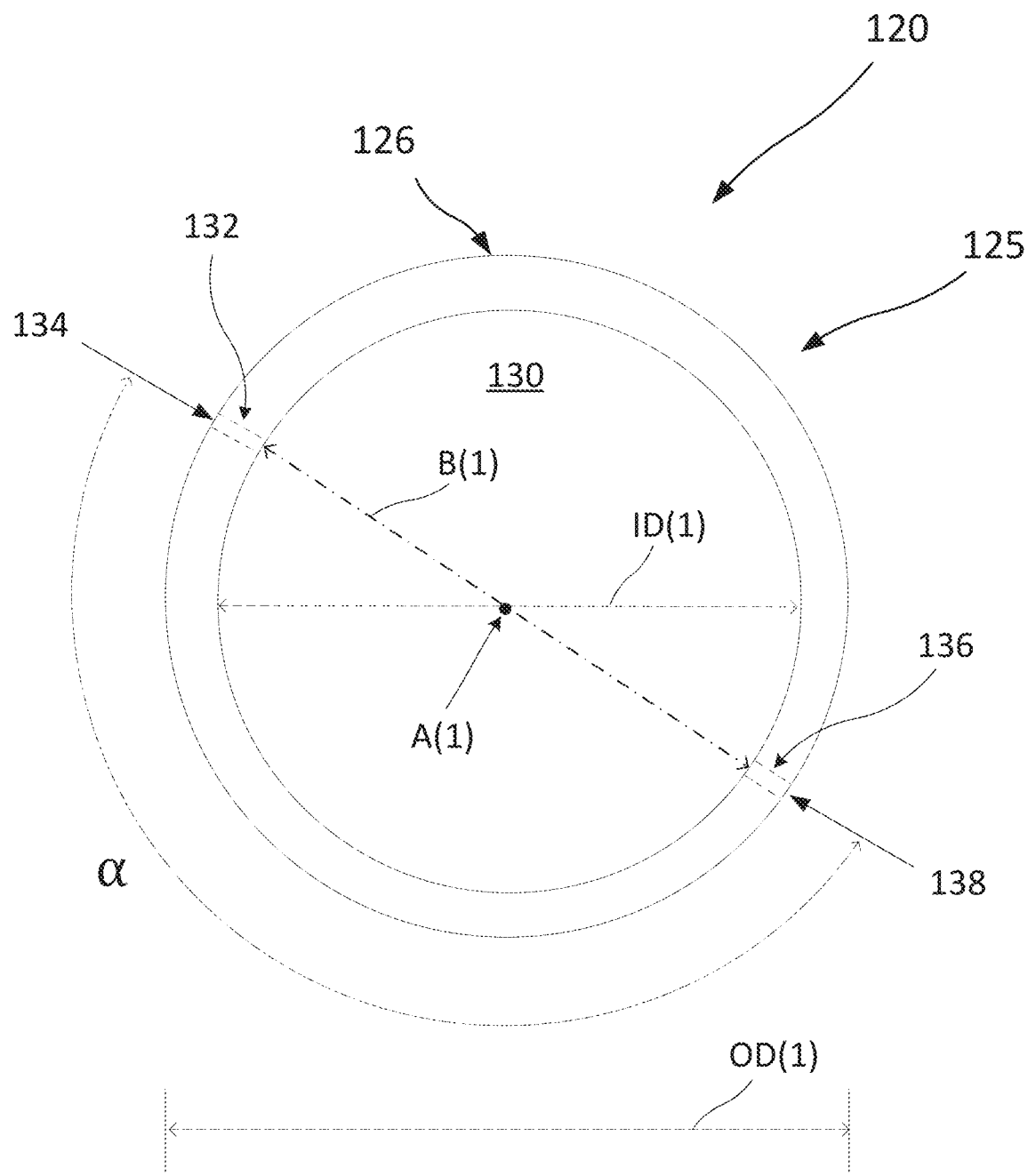

FIG. 1B provides a top-down view of container body 120 in the upright position. The container body 120 includes an open top portion 125 and a closed bottom portion 130. As shown here, the open top portion 125 includes a cylindrical wall 126 having an inner diameter ID(1) and an outer diameter OD(1). The cylindrical wall 126 of the open top portion 125 defines a central longitudinal axis A(1). Further, the cylindrical wall 126 of the open top portion 125 includes a first aperture 132 disposed at a first radial location 134 on the cylindrical wall 126 and a second aperture 136 disposed at a second radial location 138 on the cylindrical wall 126. As shown here, the first radial location 134 and the second radial location 138 are separated by an angle α. According to some embodiments, angle α can be 180 degrees. The first radial location 134 and the second radial location 138 define an axis B(1) that intersects the central longitudinal axis A(1) defined by the cylindrical wall 126 of the open top portion 125. As discussed elsewhere herein, the tubular container body 120 can include a compostable material.

Figure 1C:
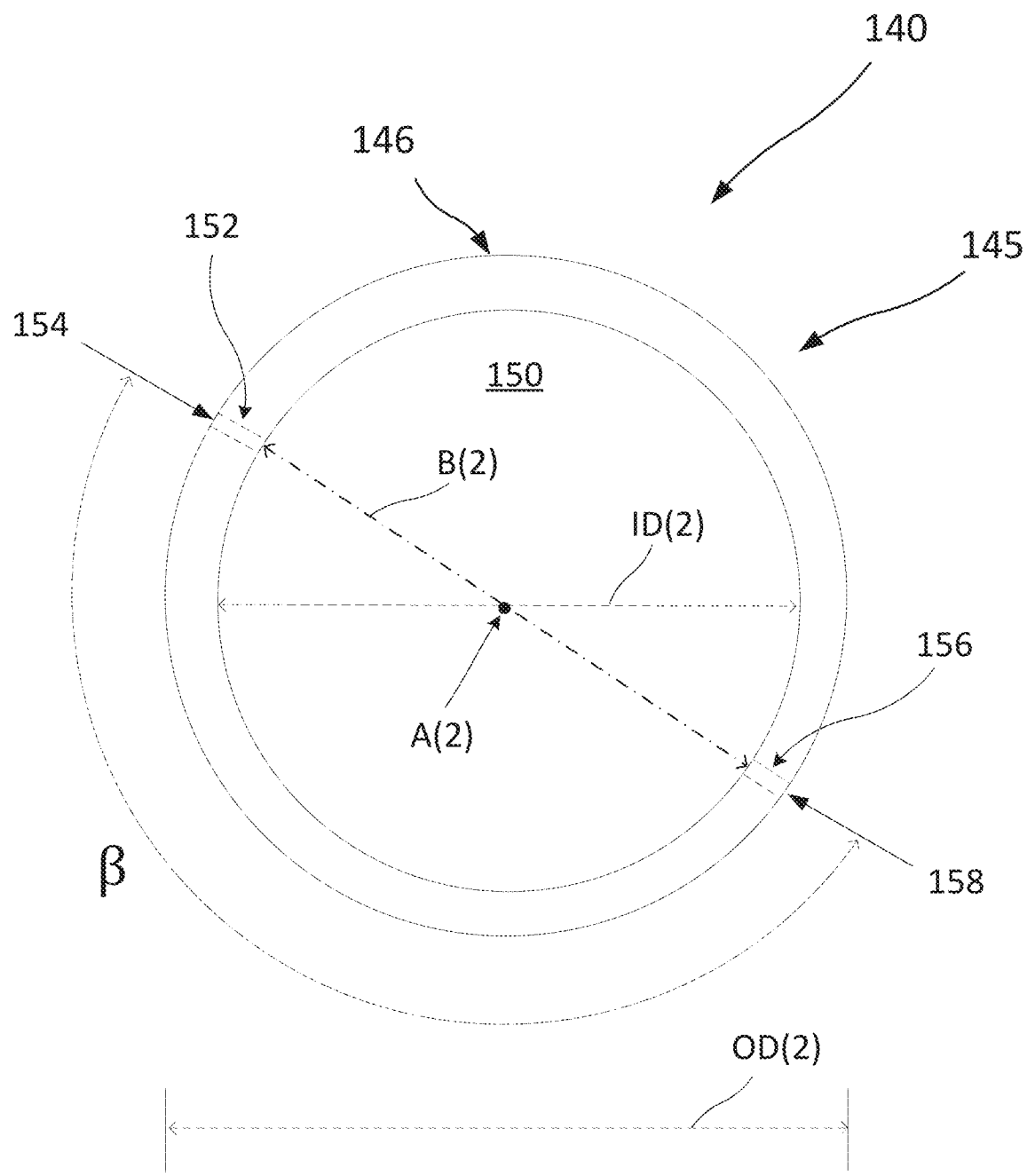

FIG. 1C provides a top-down view of cap body 140 in the upside-down position. The cap body 140 includes an open bottom portion 145 and a closed top portion 150. As shown here, the open bottom portion 145 includes a cylindrical wall 146 having an inner diameter ID(2) and an outer diameter OD(2). The cylindrical wall 146 of the open bottom portion 145 defines a central longitudinal axis A(2). Further, the cylindrical wall 146 of the open top portion 145 includes a first aperture 152 disposed at a first radial location 154 on the cylindrical wall 146 and a second aperture 156 disposed at a second radial location 158 on the cylindrical wall 146. As shown here, the first radial location 154 and the second radial location 158 are separated by an angle β. According to some embodiments, angle β can be 180 degrees. The first radial location 154 and the second radial location 158 define an axis B(2) that intersects the central longitudinal axis A(2) defined by the cylindrical wall 146 of the open top portion 145. As discussed elsewhere herein, the tubular cap body 140 can include a compostable material. When container body 120 and cap body 140 are engaged and their respective registration markers are aligned, first apertures 132, 152 are aligned, and second apertures 136, 156 are aligned. Relatedly, having equivalency between angles α and β can facilitate alignment of the respective apertures.

Figure 1D:
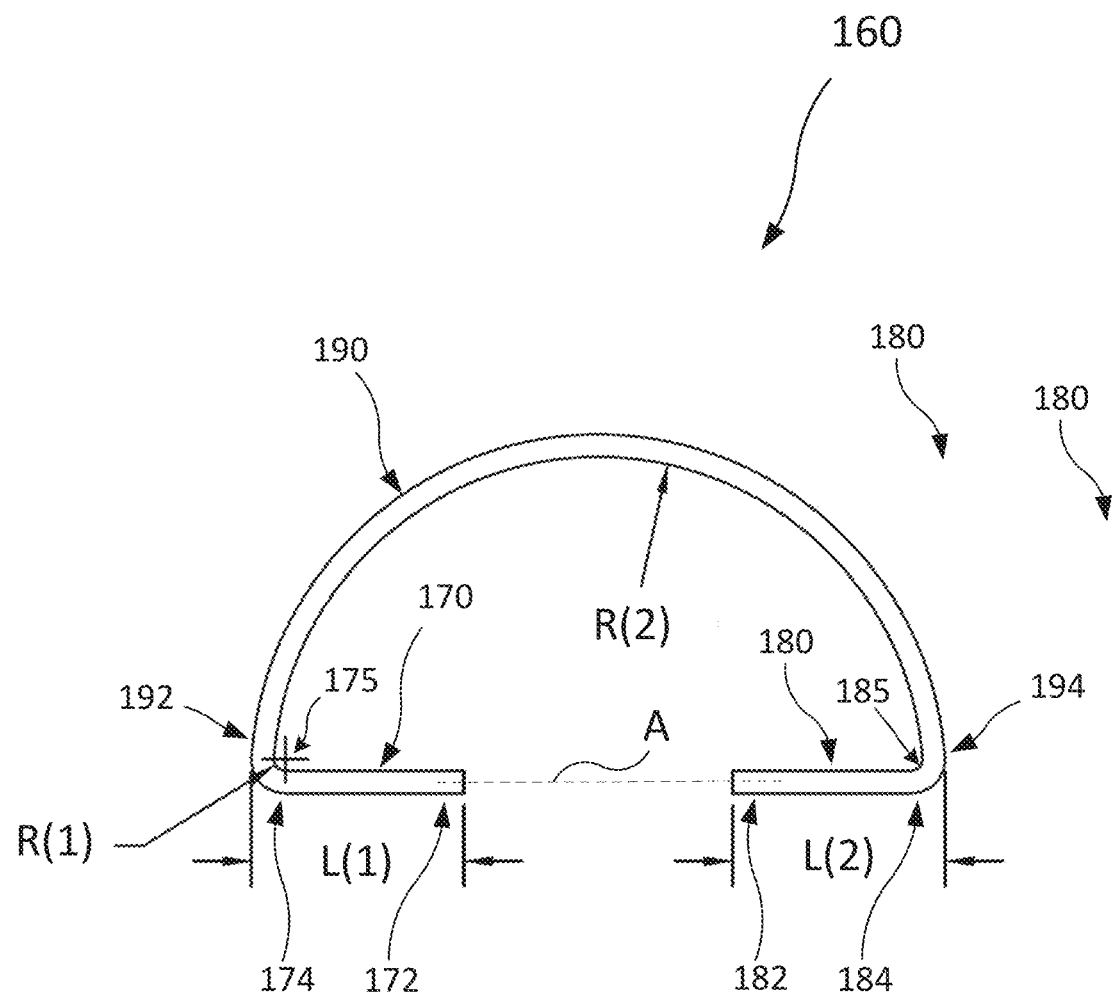

FIG. 1D depicts additional aspects of locking pin 160. According to some embodiments, locking pin 160 is a bendable locking pin. As shown here, locking pin 160 includes a first end segment 170, a second end segment 180, and an intermediate segment 190 disposed between the first and second end segments. According to some embodiments, first end segment 170 is a linear segment. First end segment 170 can have a length L(1). In some cases, L(1) is 0.85 inches. According to some embodiments, second end segment 180 is a linear segment. Second end segment 180 can have a length L(2). In some cases, L(2) is 0.85 inches. First segment 170 has a central end 172 and a peripheral end 174. Second segment 180 has a central end 182 and a peripheral end 184. In some cases, a locking pin can include a malleable or ductile material that can be deformed, so as to undergo a non-reversible change in shape in response to an applied force. In some cases, a locking pin can include an elastic material that can be deformed in response to an applied force, and that returns to its original shape when the applied force is no longer present.

Intermediate segment 190 has a first end 192 and a second end 194. According to some embodiments, intermediate segment 190 is a curved segment. In some cases, intermediate segment 190 is a semicircular segment. As shown here, the peripheral end 174 of the first segment 170 is attached or contiguous with the first end 192 of the intermediate segment 190, and the peripheral end 184 of the second segment 180 is attached or contiguous with the second end 194 of the intermediate segment 190. According to some embodiments, a bend 175 that joins or is defined by first end 192 and peripheral end 174 has a radius of curvature R(1) of 0.045. A similar bend 185 that joins or is defined by second end 194 and peripheral end 184 can have a similar radius of curvature. According to some embodiments, intermediate segment 190 can have a radius of curvature R(2) of 1.3. As shown in FIG. 1D, the first segment 170 and the second segment 180 can be aligned along a common axis A. As discussed elsewhere herein, the locking pin 160 can include a recyclable material. For example, the locking pin can be manufactured from galvanized wire. In some cases, the locking pin can include a recyclable metal such as steel or aluminum, and/or a recyclable plastic, such as polyethylene terephthalate (PETE), high-density polyethylene (HDPE), polypropylene (PP), acrylic, polycarbonate, nylon, or fiberglass. In some cases, the locking pin can include a fusible link or splicing wire. In some cases, the locking pin can be a spring-loaded clip. In some cases, the diameter of the pin can be 0.90 inches.

With reference to FIGS. 1B and 1C, according to some embodiments the inner diameter ID(2) of the open bottom portion 145 of the cylindrical wall 146 of the tubular cap body 140 is greater than the outer diameter OD(1) of the cylindrical wall 126 of the tubular container body 120. As seen in FIGS. 1B and 1C, the container body and cap body can have a round or circular cross-section. According to some embodiments, container and cap bodies can have another cross-section shape, such as a square, a rectangle, any polygon shape, an ellipse, or the like.

Figure 2A:
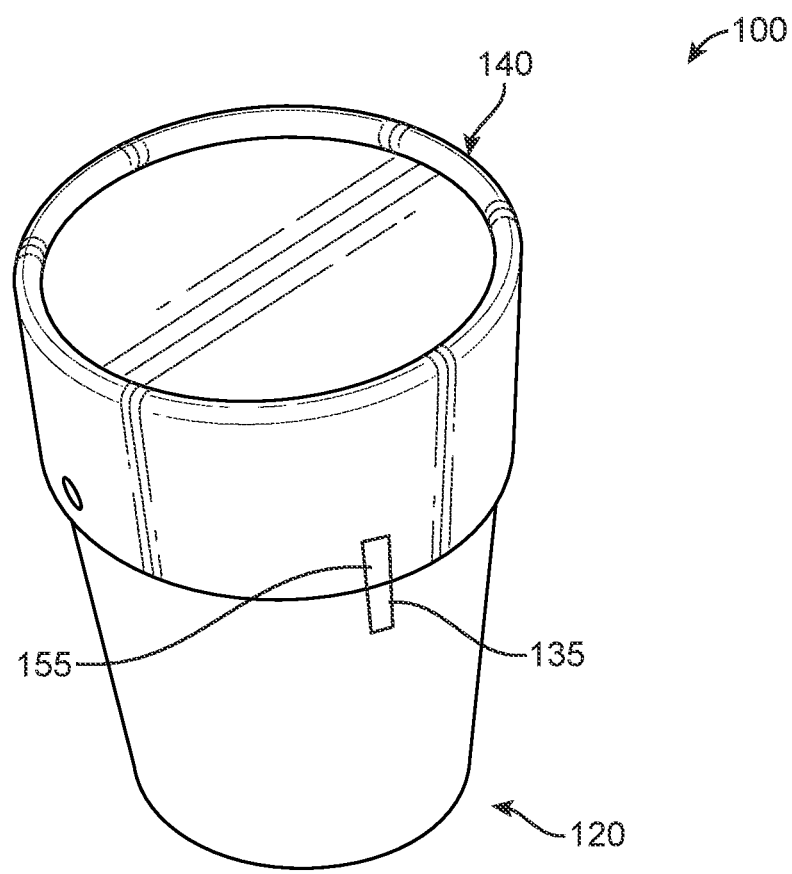
FIGS. 2A to 2F depict aspects of a child-resistant safety container system according to embodiments of the present invention.
Figure 2A:
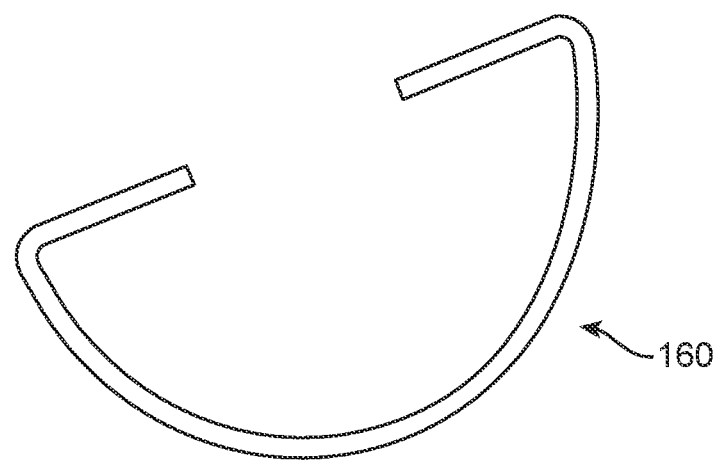

As shown in FIG. 2A, the cap body 140 can be inverted so that it is in an upright position, and placed over the top of the container body 120, which is also in the upright position, so that the registration mark 135 of the container body 120 and the registration mark 155 of the cap body 140 are aligned.

Figure 2B:
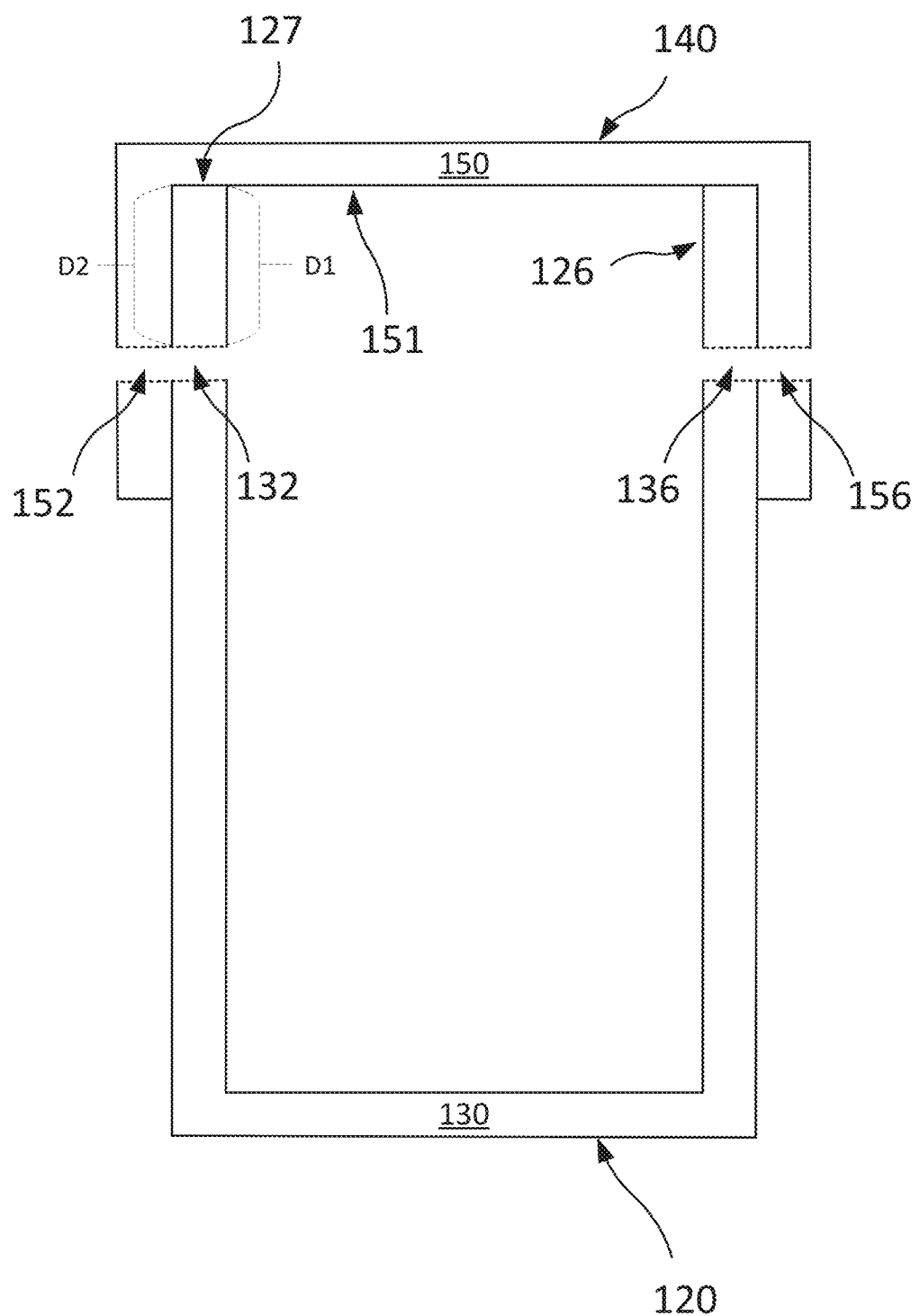

When the registration marks 135, 155 are aligned, the apertures are radially aligned as depicted in FIG. 2B. As shown here, the first aperture 132 of the container body 120 is aligned with the first aperture 152 of the cap body 140, and the second aperture 126 of the container body 120 is aligned with the second aperture 156 of the cap body 140.

The vertical positioning of the apertures along the height of the container body 120 and the cap body 140 can also facilitate alignment of the apertures. For example, as shown here, the container body apertures 132, 136 can be located at a distance D1 from the top rim 127 of the cylindrical wall 126. Similarly, the cap body apertures 152, 156 can be located at a distance D2 from the bottom surface 151 of the closed top portion 150. Hence, when the cap body 140 and the container body 120 are fully engaged, such that the top rim 127 of the container body 120 contacts the bottom surface 151 of the cap body closed top portion 150, there is vertical alignment between the apertures.

Figure 2C:
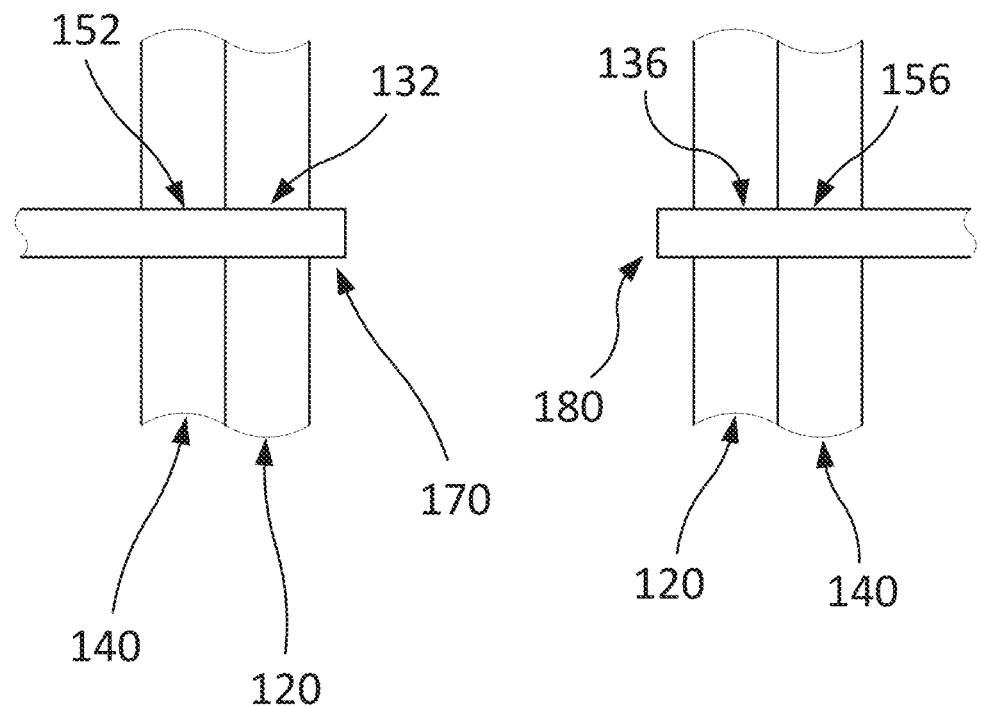
Figure 2D:
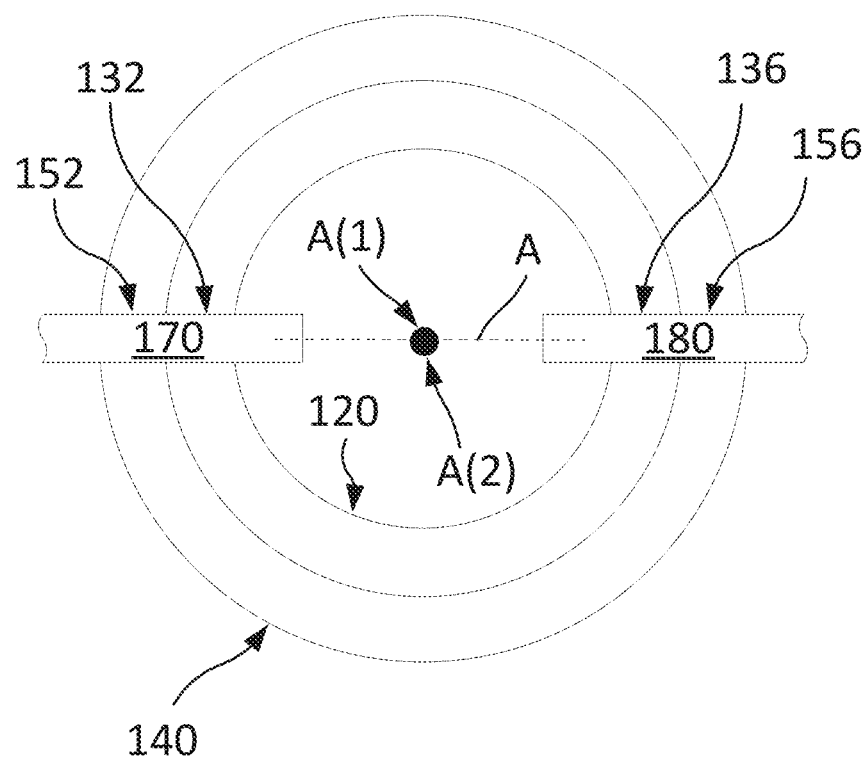

As depicted in the vertical cross-section view of FIG. 2C, when apertures 132 and 152 are adjacent (e.g. vertically aligned as shown here, as well as radially aligned as shown in FIG. 2D), they can cooperatively receive the first segment 170 of the locking pin 160. For example, apertures 132, 152 can together define a combined aperture into or through which first segment 170 can be inserted. Similarly, when apertures 136 and 156 are adjacent (e.g. vertically aligned as shown here, as well as radially aligned as shown in FIG. 2D), they can cooperatively receive the second segment 180 of the locking pin 160. For example, apertures 136, 156 can together define a combined aperture into or through which second segment 180 can be inserted.

As depicted in the horizontal cross-section view of FIG. 2D, when apertures 132 and 152 are adjacent (e.g. radially aligned as shown here, as well as vertically aligned as shown in FIG. 2C), they can cooperatively receive the first segment 170 of the locking pin 160. For example, apertures 132, 152 can together define a combined aperture into or through which first segment 170 can be inserted. Similarly, when apertures 136 and 156 are adjacent (e.g. radially aligned as shown here, as well as vertically aligned as shown in FIG. 2C), they can cooperatively receive the second segment 180 of the locking pin 160. For example, apertures 136, 156 can together define a combined aperture into or through which second segment 180 can be inserted. A common axis A that is aligned with a central longitudinal axis of first segment 170 and a central longitudinal axis of second segment 180 intersects a central longitudinal axis A(1) defined by a cylindrical wall of the container body 120, and also intersects a central longitudinal axis A(2) defined by a cylindrical wall of the cap body 140, wherein axis A(1) is coaxial with axis A(2).

Figure 2E:
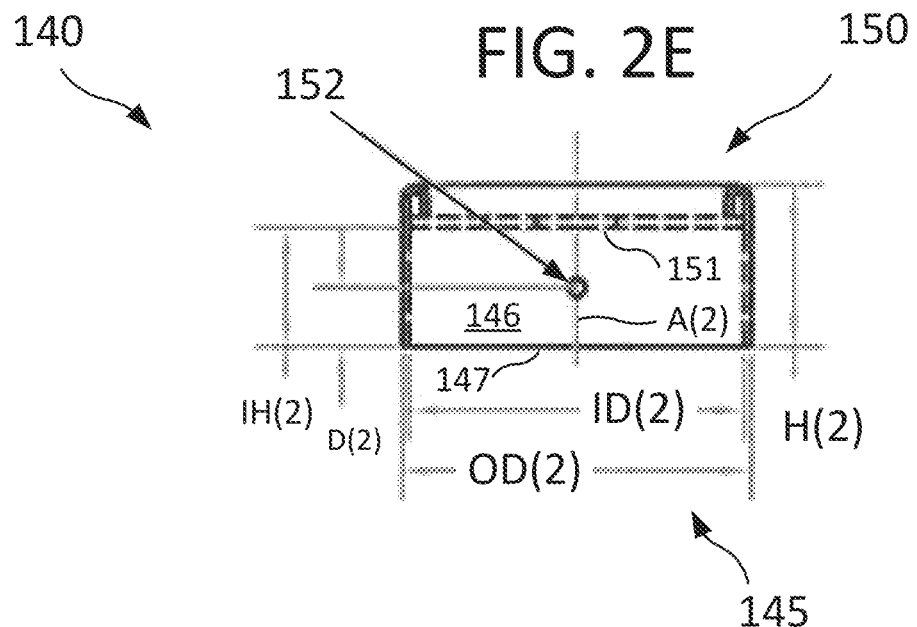

FIG. 2E provides a cross-section view of a cap body 140, according to embodiments of the present invention. As shown here, cap body 140 has a closed top portion 150 and an open bottom portion 145. The open bottom portion 125 includes a cylindrical wall 146 having an inner diameter ID(2) and an outer diameter OD(2). According to some embodiments, ID(2) can be 2.096 inches and OD(2) can be 2.188 inches. The cylindrical wall 146 of the open top portion 125 defines a central longitudinal axis A(2). Further, the cylindrical wall 126 includes a first aperture 152 and a second aperture (not shown). The apertures can be a distance D2 from the bottom surface 151 of the closed top portion 150. In some cases, D2 can be 0.375±0.031 inches. According to some embodiments, the apertures can have a diameter of 0.125 inches. The cap body can have a height H(2). In some cases, height H(2) is 1.012 inches. The container body can also have an interior height IH(2), which can be defined as the distance between the bottom surface 151 of the closed top portion 150 and the lower rim 147 of the open bottom portion 145. In some cases, IH(2) can have a value of 0.750±0.031 inches. The cap body 140 can include a compostable material. For example, the compostable material may be kraft paperboard. In some cases, the compostable material can include a compostable plastic, such as polyvinyl alcohol, starch derivatives, cellulose acetate, or the like. In some cases, the cap body 140 can include a water-proof material. In some cases, the cap body 140 may include a material that is not water-proof.

Figure 2F:
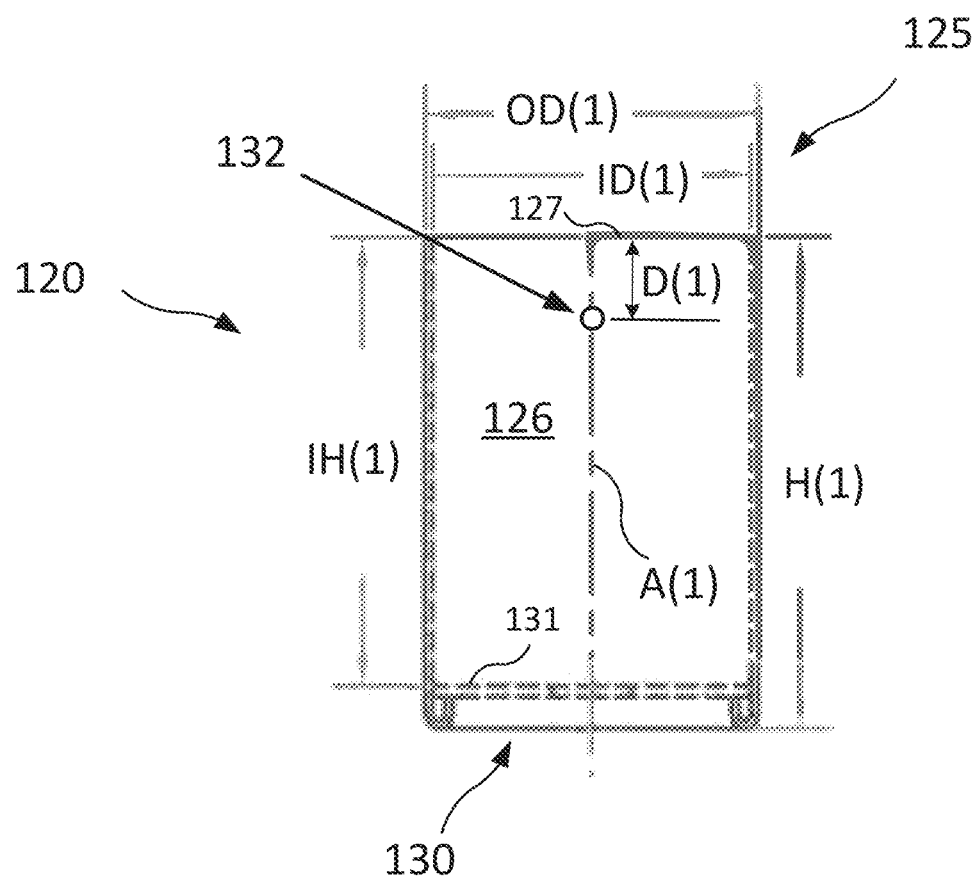

FIG. 2F provides a cross-section view of a container body 120, according to embodiments of the present invention. As shown here, container body 120 has an open top portion 125 and a closed bottom portion 130. The open top portion 125 includes a cylindrical wall 126 having an inner diameter ID(1) and an outer diameter OD(1). According to some embodiments, ID(1) can be 1.990 inches and OD(1) can be 2.084 inches. The cylindrical wall 126 of the open top portion 125 defines a central longitudinal axis A(1). Further, the cylindrical wall 126 of the open top portion 125 includes a first aperture 132 and a second aperture (not shown). The apertures can be a distance D1 from the top rim 127 of the cylindrical wall 126. According to some embodiments, the apertures can have a diameter of 0.125 inches. The container body can have a height H(1). In some cases, height H(1) is 3.075 inches. The container body can also have an interior height IH(1), which can be defined as the distance between the top rim 127 and the top surface 131 of the closed bottom portion 130. In some cases, IH(1) can have a value of 2.812±0.031 inches. The container body 120 can include a compostable material. For example, the compostable material may be kraft paperboard. In some cases, the compostable material can include a compostable plastic, such as polyvinyl alcohol, starch derivatives, cellulose acetate, or the like. In some cases, the container body 120 can include a water-proof material. In some cases, the container body 120 may include a material that is not water-proof.

As described elsewhere herein, the vertical positioning of the apertures along the height of the container body 120 and the cap body 140 can facilitate alignment of the apertures. For example, as shown here, the container body apertures can be located at a distance D1 from the top rim 127 of the cylindrical wall 126. Similarly, the cap body apertures can be located at a distance D2 from the bottom surface 151 of the closed top portion 150. Hence, when the cap body 140 and the container body 120 are fully engaged, such that the top rim 127 of the container body 120 contacts the bottom surface 151 of the cap body closed top portion 150, there is vertical alignment between the apertures.

Figure 3:
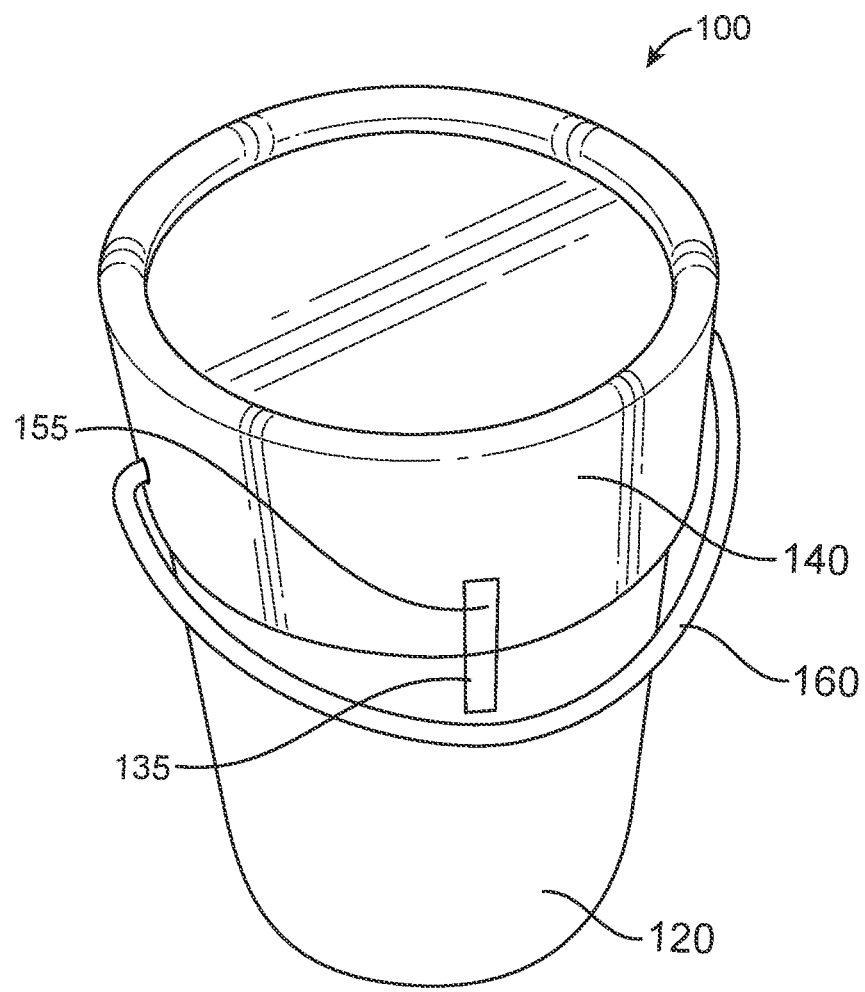
FIG. 3 depicts aspects of a child-resistant safety container system according to embodiments of the present invention.

FIG. 3 depicts an assembled child-resistant safety container system 100 according to embodiments of the present invention. In a method of storing a medicament or other material in the system 100, the material can be placed within the container body 120, the cap body 140 can be placed over the open top portion of the container body 120, and the registration mark 155 of the cap body can be aligned with the registration mark 135 of the container body. Apertures of the cap body are aligned with apertures of the container body, so that a first segment of the locking pin 160 can be passed through a first aperture of the cap body and a first aperture of the container body, and a second segment of the locking pin 160 can be passed through a second aperture of the cap body and a second aperture of the container body. In a method of removing a medicament or other material from the assembled system 100, the locking pin can be bent or otherwise deformed or disengaged from the cap and container bodies, for example by retracting first segment and/or second segment of the locking pin from the respective cap and container apertures. The cap and container bodies can be separated, and the material can be removed from the container body.

Figure 4:
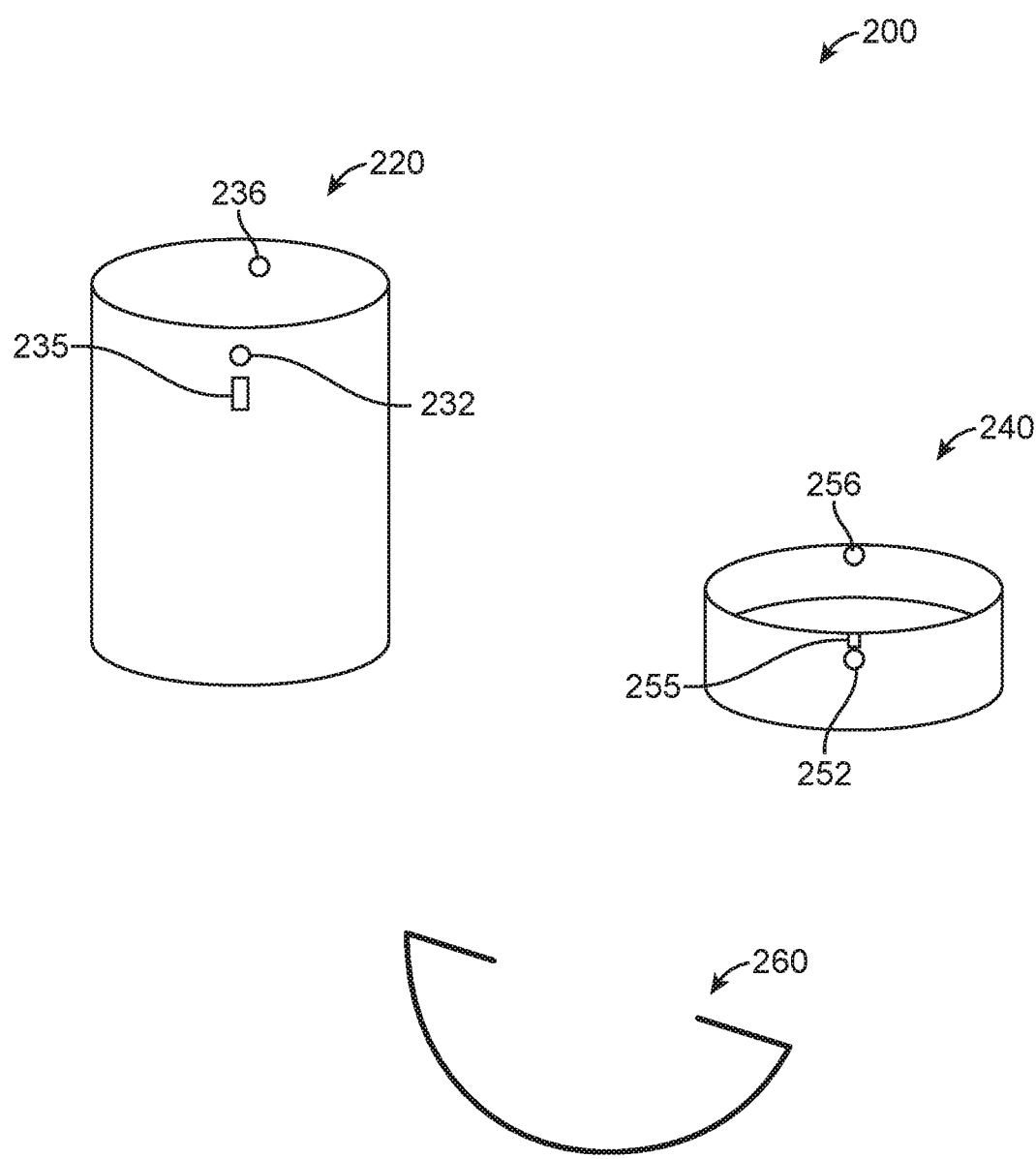
FIG. 4 depicts aspects of a child-resistant safety container system according to embodiments of the present invention.

FIG. 4 illustrates a child-resistant safety container system 200 according to embodiments of the present invention. The container system 200 includes a container body 220 (shown in an upright position), a cap body 240 (shown in an upside-down position), and a locking pin 260. Container body 220 includes a registration mark 235, a first aperture 232, and a second aperture 236. As shown here, registration mark 235 and first aperture 232 are in vertical alignment with one another. Cap body 240 includes a registration mark 255, a first aperture 152, and a second aperture 156. As shown here, registration mark 255 and first aperture 252 are in vertical alignment with one another. When container body 220 and cap body 240 are engaged and their respective registration markers are aligned, first apertures 232, 252 are aligned, second apertures 236, 256 are aligned, and locking pin 260 can be engaged with first apertures 232, 252 and second apertures 236, 256, as described elsewhere herein.

Figure 5A:
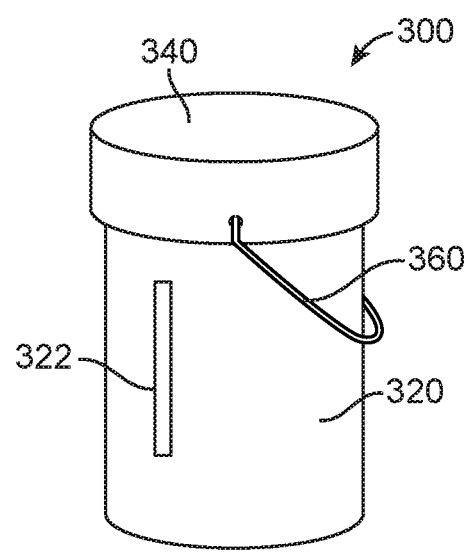
FIGS. 5A to 5C depict aspects of child-resistant safety container systems according to embodiments of the present invention.

FIG. 5A illustrates a child-resistant safety container system 300 according to embodiments of the present invention. The container system 300 includes a container body 320, a cap body 340, and a locking pin 360. Container body 320 may include an aperture or slot 322. In some cases, container system 300 can be used as a catfish bait trap. For example, pieces of chicken liver can be placed within the container system, and the container system can be placed in a lake or river, so as to attract catfish thereto.

Figure 5B:
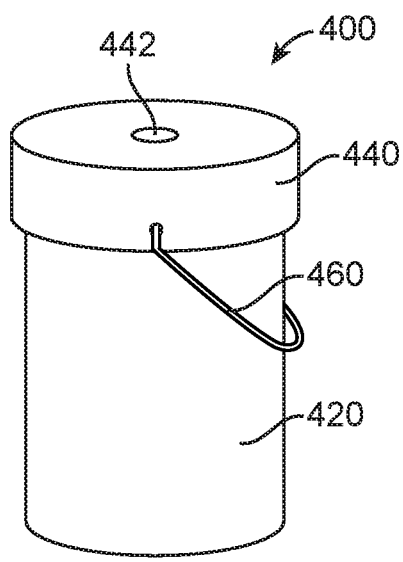

FIG. 5B illustrates a child-resistant safety container system 400 according to embodiments of the present invention. The container system 400 includes a container body 420, a cap body 440, and a locking pin 460. Cap body 440 may include an aperture or slot 442. In some cases, container system 400 can be used as a catfish bait trap. For example, pieces of chicken liver can be placed within the container system, and the container system can be placed in a lake or river, so as to attract catfish thereto.

Figure 5C:
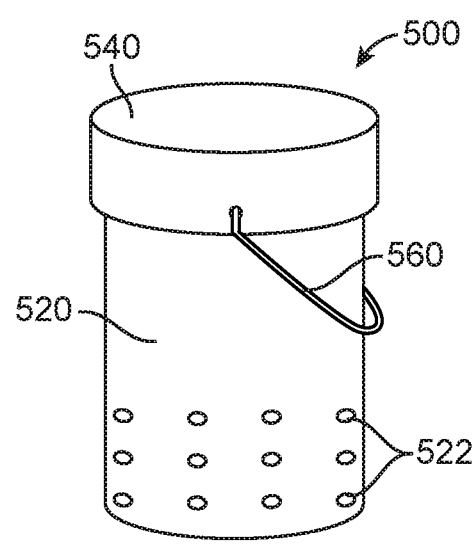

FIG. 5C illustrates a child-resistant safety container system 500 according to embodiments of the present invention. The container system 500 includes a container body 520, a cap body 540, and a locking pin 560. Container body 520 may include a plurality of apertures or holes 522. In some cases, container system 500 can be used as a catfish bait trap. For example, pieces of chicken liver can be placed within the container system, and the container system can be placed in a lake or river, so as to attract catfish thereto.

Figure 6A:
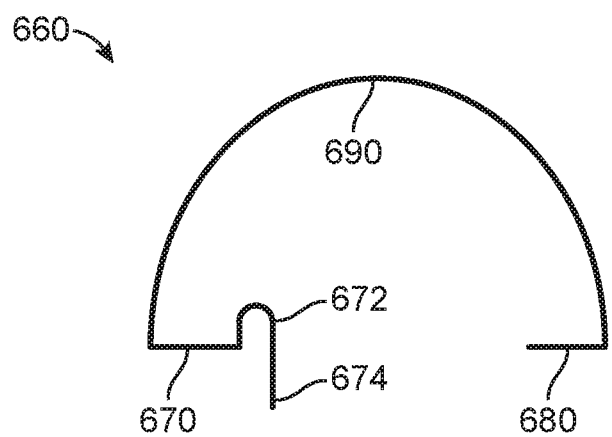
FIGS. 6A to 6C depict aspects of child-resistant safety container systems according to embodiments of the present invention.

FIG. 6A illustrates aspects of a locking pin 660 of a child-resistant safety container system, according to embodiments of the present invention. Locking pin 660 includes a first end segment 670, a second end segment 680, and an intermediate segment 690 disposed between the first and second end segments. First end segment 670 also includes a hook extension 672 having a projection 674 that extends away from the intermediate segment 690. In some cases, hook extension 672 operates to provide an additional child-resistant opening feature. In some cases, hook extension 672 operates to provide a hook feature, for example to catch fish and animals.

Figure 6B:
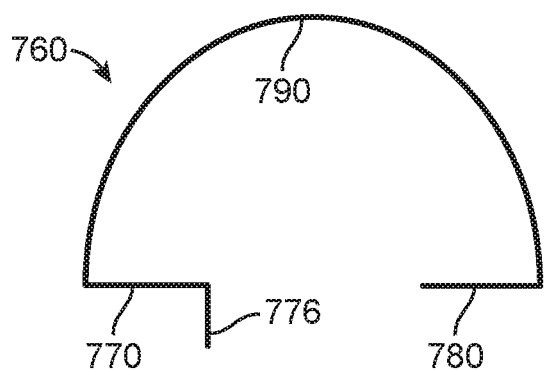

FIG. 6B illustrates aspects of a locking pin 760 of a child-resistant safety container system, according to embodiments of the present invention. Locking pin 760 includes a first end segment 770, a second end segment 780, and an intermediate segment 790 disposed between the first and second end segments. First end segment 770 also includes a pin extension 776 that extends away from the intermediate segment 790. In some cases, pin extension 776 operates to provide an additional child-resistant opening feature. In some cases, pin extension 776 operates to provide a hook feature, for example to catch fish and animals.

Figure 6C:
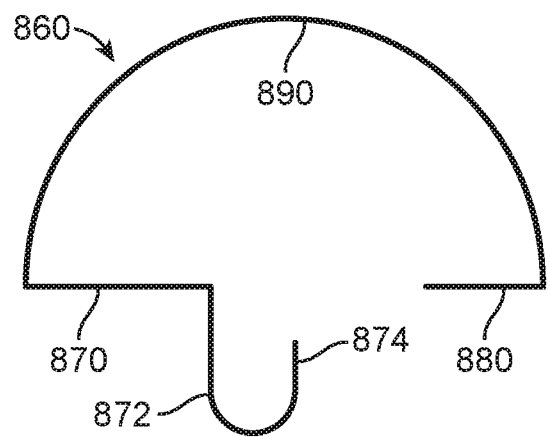

FIG. 6C illustrates aspects of a locking pin 860 of a child-resistant safety container system, according to embodiments of the present invention. Locking pin 860 includes a first end segment 870, a second end segment 880, and an intermediate segment 890 disposed between the first and second end segments. First end segment 870 also includes a hook extension 872 having a projection 874 that extends toward the intermediate segment 890. In some cases, hook extension 872 operates to provide an additional child-resistant opening feature. In some cases, hook extension 872 operates to provide a hook feature, for example to catch fish and animals.

It is understood that any of the cap body and/or container body embodiments disclosed herein may be used in conjunction with any of the locking pin embodiments disclosed herein.

All features of the described systems and devices are applicable to the described methods mutatis mutandis, and vice versa. Embodiments of the present invention encompass kits having child-resistant safety container systems as disclosed herein. In some embodiments, the kit includes one or more container systems, along with instructions for using the system for example according to any of the methods disclosed herein.

Although the foregoing invention has been described in some detail by way of illustration and example for purposes of clarity of understanding, one of skill in the art will appreciate that certain changes, modifications, alternate constructions, and/or equivalents may be practiced or employed as desired, and within the scope of the appended claims. In addition, each reference provided herein in incorporated by reference in its entirety to the same extent as if each reference was individually incorporated by reference. Relatedly, all publications, patents, patent applications, journal articles, books, technical references, and the like mentioned in this specification are herein incorporated by reference to the same extent as if each individual publication, patent, patent application, journal article, book, technical reference, or the like was specifically and individually indicated to be incorporated by reference.

What is claimed is:

1. A child-resistant safety container system for holding a substance, the system comprising:
   (a) a tubular container body having an open top portion, a closed bottom portion, and a registration mark,
      wherein the open top portion comprises a cylindrical wall having an inner diameter and an outer diameter,
      wherein the cylindrical wall of the open top portion defines a central longitudinal axis,
      wherein the cylindrical wall of the open top portion includes a first aperture disposed at a first radial location on the cylindrical wall and a second aperture disposed at a second radial location on the cylindrical wall, and
      wherein the first radial location and the second radial location define an axis that intersects the central longitudinal axis defined by the cylindrical wall of the open top portion;
   (b) a tubular cap body having a closed top portion, an open bottom portion, and a registration mark,
      wherein the open bottom portion comprises a cylindrical wall having an inner diameter and an outer diameter,
      wherein the cylindrical wall of the open bottom portion defines a central longitudinal axis,
      wherein the cylindrical wall of the open bottom portion includes a first aperture disposed at a first radial location on the cylindrical wall and a second aperture disposed at a second radial location on the cylindrical wall, and
      wherein the first radial location and the second radial location define an axis that intersects the central longitudinal axis defined by the cylindrical wall of the open bottom portion; and
   (c) a bendable locking pin having a first linear length, a second linear length, and a semicircular length,
      wherein the semicircular length has a first end and a second end,
      wherein the first linear length has an inner end and an outer end, and the outer end is coupled with the first end of the semicircular length,
      wherein the second linear length has an inner end and an outer end, and the outer end is coupled with the second end of the semicircular length, and
      wherein the first linear length and the second linear length are aligned along a common axis;
   wherein the inner diameter of the open bottom portion of the cylindrical wall of the tubular cap body is greater than the outer diameter of the cylindrical wall of the tubular container body,
   wherein the first linear length of the bendable locking pin extends through (i) the first aperture of the cylindrical wall of the open top portion of the tubular container body and (ii) the first aperture of the cylindrical wall of the open bottom portion of the tubular cap body,
   wherein the second linear length of the bendable locking pin extends through (i) the second aperture of the cylindrical wall of the open top portion of the tubular container body and (ii) the second aperture of the cylindrical wall of the open bottom portion of the tubular cap body, and wherein the registration mark of the tubular container body and the registration mark of the tubular cap body are aligned when (i) the first aperture of the cylindrical wall of the open top portion of the tubular container body is adjacent the first aperture of the cylindrical wall of the open bottom portion of the tubular cap body, and (ii) the second aperture of the cylindrical wall of the open top portion of the tubular container body is adjacent the second aperture of the cylindrical wall of the open bottom portion of the tubular cap body.

2. The container system of claim 1, wherein the first aperture of the tubular container body and the second aperture of the tubular container body are radially separated by an angle of 180 degrees, and wherein the first aperture of the tubular cap body and the second aperture of the tubular cap body are radially separated by an angle of 180 degrees.

3. The container system of claim 1, wherein the first aperture of the tubular container body and the second aperture of the tubular container body are radially separated by an angle that is less than 180 degrees, and wherein the first aperture of the tubular cap body and the second aperture of the tubular cap body are radially separated by an angle that is less than 180 degrees.

4. The container system of claim 1, wherein the tubular container body comprises a compostable material selected from the group consisting of a kraft paperboard and a compostable plastic.

5. The container system of claim 1, wherein the tubular cap body comprises a compostable material selected from the group consisting of a kraft paperboard and a compostable plastic.

6. The container system of claim 1, wherein the locking pin comprises a recyclable material selected from the group consisting of a metal and a plastic.

7. The container system of claim 1, wherein the first and second apertures of the tubular cap body are separated from a bottom surface of the closed top portion of the tubular cap body by a distance D2, wherein the first and second apertures of the tubular container body are separated from a top rim of the open top portion of the tubular container body by a distance D1, and wherein distance D1 is equal to distance D2.

8. A child-resistant safety container system for holding a substance, the system comprising:
(a) a container body having an open top portion, a closed bottom portion, and a registration mark,
wherein the open top portion comprises a wall,
wherein the wall of the open top portion defines a central longitudinal axis,
wherein the wall of the open top portion includes a first aperture disposed at a first radial location on the wall and a second aperture disposed at a second radial location on the wall, and
wherein the first radial location and the second radial location define an axis that intersects the central longitudinal axis defined by the wall of the open top portion;
(b) a cap body having a closed top portion, an open bottom portion, and a registration mark,
wherein the open bottom portion comprises a wall,
wherein the wall of the open bottom portion defines a central longitudinal axis,
wherein the wall of the open bottom portion includes a first aperture disposed at a first radial location on the wall and a second aperture disposed at a second radial location on the wall, and
wherein the first radial location and the second radial location define an axis that intersects the central longitudinal axis defined by the wall of the open bottom portion; and
(c) a bendable locking pin having a first linear length, a second linear length, and an intermediate length,
wherein the intermediate length has a first end and a second end,
wherein the first linear length has an inner end and an outer end, and the outer end is coupled with the first end of the intermediate length,
wherein the second linear length has an inner end and an outer end, and the outer end is coupled with the second end of the intermediate length, and
wherein the first linear length and the second linear length are aligned along a common axis;
wherein the first linear length of the bendable locking pin extends through (i) the first aperture of the wall of the open top portion of the container body and (ii) the first aperture of the wall of the open bottom portion of the cap body,
wherein the second linear length of the bendable locking pin extends through (i) the second aperture of the wall of the open top portion of the container body and (ii) the second aperture of the wall of the open bottom portion of the cap body, and
wherein the registration mark of the container body and the registration mark of the cap body are aligned when (i) the first aperture of the wall of the open top portion of the container body is adjacent the first aperture of the wall of the open bottom portion of the cap body, and (ii) the second aperture of the wall of the open top portion of the container body is adjacent the second aperture of the wall of the open bottom portion of the cap body.

9. The container system of claim 8, wherein the first aperture of the tubular container body and the second aperture of the tubular container body are radially separated by an angle of 180 degrees, and wherein the first aperture of the tubular cap body and the second aperture of the tubular cap body are radially separated by an angle of 180 degrees.

10. The container system of claim 8, wherein the first aperture of the tubular container body and the second aperture of the tubular container body are radially separated by an angle that is less than 180 degrees, and wherein the first aperture of the tubular cap body and the second aperture of the tubular cap body are radially separated by an angle that is less than 180 degrees.

11. The container system of claim 8, wherein the container body comprises a compostable material selected from the group consisting of a kraft paperboard and a compostable plastic.

12. The container system of claim 8, wherein the cap body comprises a compostable material selected from the group consisting of a kraft paperboard and a compostable plastic.

13. The container system of claim 8, wherein the locking pin comprises a recyclable material selected from the group consisting of a metal and a plastic.

14. The container system of claim 8, wherein the first and second apertures of the tubular cap body are separated from a bottom surface of the closed top portion of the tubular cap body by a distance D2, wherein the first and second apertures of the tubular container body are separated from a top rim of the open top portion of the tubular container body by a distance D1, and wherein distance D1 is equal to distance D2.

\* \* \* \* \*